April 13, 1943.  A. J. VAN DEN BERG  2,316,198
TEMPERATURE WATER METER
Filed Feb. 9, 1940   2 Sheets-Sheet 1

INVENTOR
Alan J. Van den Berg
HIS ATTORNEY

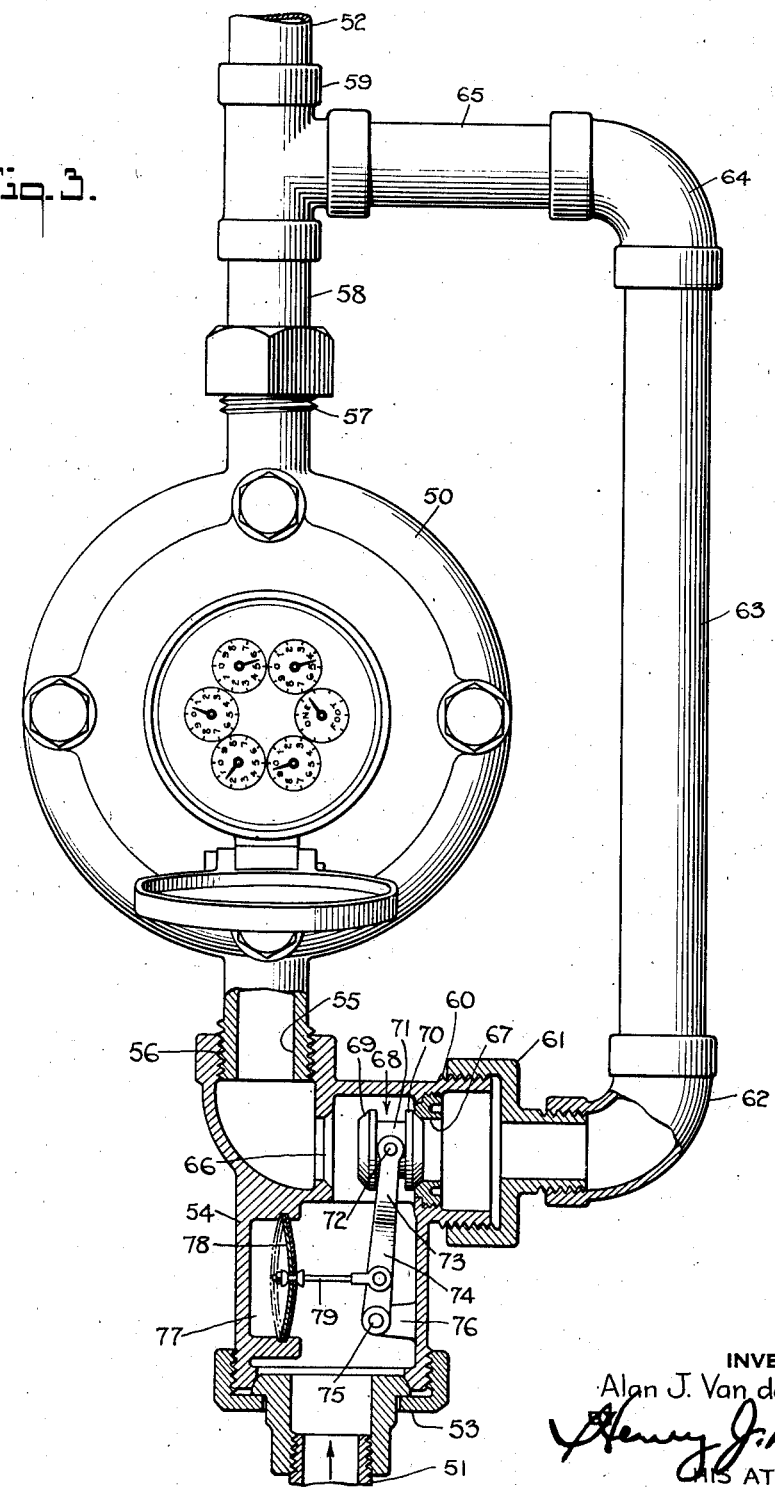

Patented Apr. 13, 1943

2,316,198

UNITED STATES PATENT OFFICE 2,316,198

TEMPERATURE WATER METER

Alan J. Van den Berg, New York, N. Y.

Application February 9, 1940, Serial No. 318,031

4 Claims. (Cl. 73—198)

My present invention relates to meters for measuring water or other liquid heated to a predetermined range of temperature.

The invention contemplates the supply of water or the like to a consumer through a suitable pipe line and the accurate measuring of water supplied provided that the temperature of the water is at least at a predetermined minimum temperature for which the consumer is willing to make payment.

To such or analogous end, the invention comprises a meter provided with suitable registering mechanism and suitable means responsive to the temperature of the liquid for effecting actuation of the registering mechanism when the temperature of the liquid is at or above the predetermined minimum temperature and for effecting non-operation of the registering mechanism when the temperature of the liquid delivered to the consumer is less than such predetermined minimum temperature.

Embodiments of the invention may be such that the water or other liquid passes through a suitable water flow actuated mechanism at less than predetermined minimum temperature and resultant non-operation of the registering mechanism as well as during the stage of operation of the registering mechanism by the water flow actuating mechanism when the temperature of the water is at or above the predetermined minimum, or of the type wherein a by-pass about the meter is provided and the temperature responsive means is so arranged relative to the registering mechanism that the liquid, when its temperature is less than the predetermined minimum, flows through such by-pass, attended by non-operation of the registering mechanism, and when the liquid temperature attains such predetermined minimum the by-pass is closed and the liquid is caused to flow through the water meter with attendant operation of its registering mechanism.

In the accompanying drawings:

Fig. 3 is a plan view partly in section of another embodiment of my invention.

Figure 1:
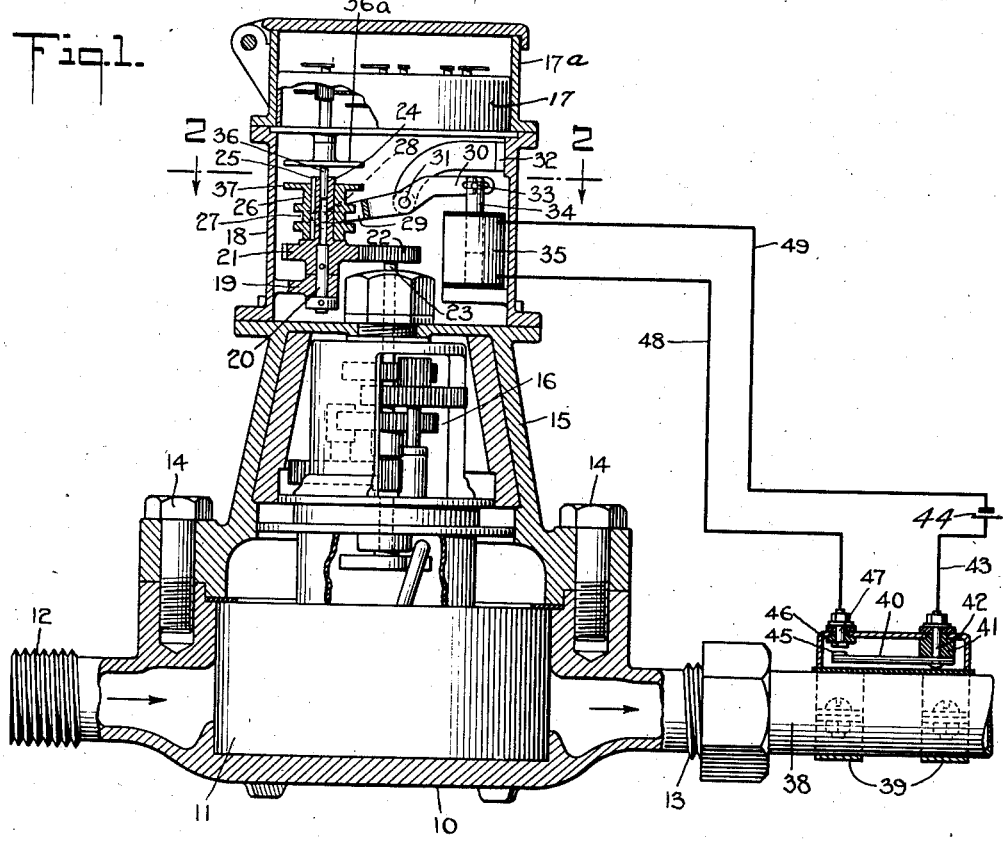
Fig. 1 is a vertical sectional elevation through a water meter and showing my improved invention embodied therein.
Figure 2:
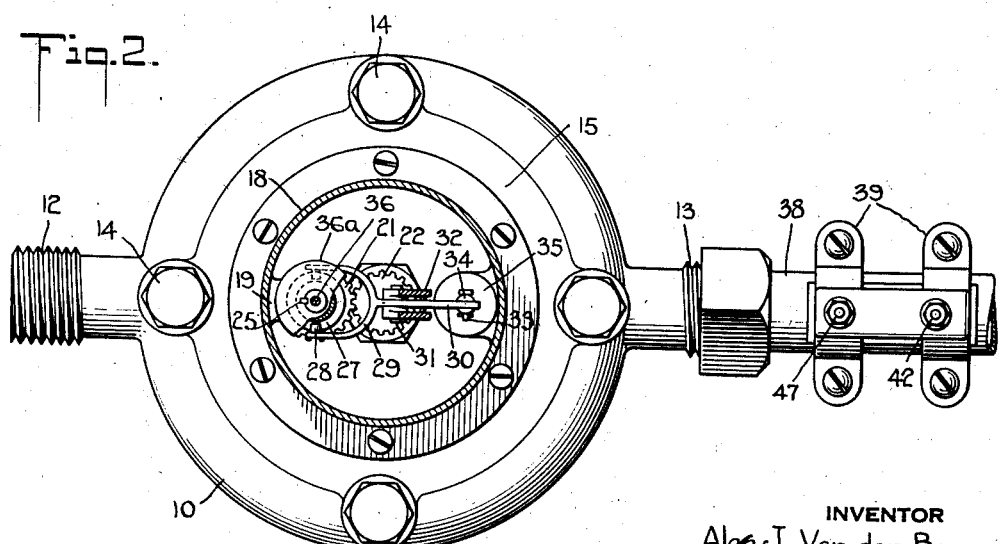
Fig. 2 is a sectional plan view taken on the line 2—2 of Fig. 1.

Referring to the drawings, particularly to Figs. 1 and 2, 10 designates the bottom portion of a standard water meter embodying a measuring chamber 11. The bottom chamber portion 10 is shown provided with a threaded inlet end 12 and a threaded outlet 13 by means of which the meter may be connected in a pipe line. Secured to the top of the bottom chamber portion 11 by bolts 14 is a casing member 15 in which is housed an oil encased suitable gear train 16. A suitable registering mechanism 17 is shown contained in a casing 17a, see Fig. 1.

Pursuant to the present invention as illustrated in Figs. 1 and 2, I correlate between the gear train 16 and the registering mechanism 17 suitable means responsive to the temperature of the water, whereby when the temperature of the water is at or above a predetermined temperature the gear train 16 is operatively connected to the registering mechanism and when the temperature of the water is less than such predetermined minimum, the registering mechanism is disconnected from the gear train 16.

One form of such temperature responsive means is illustrated in Figs. 1 and 2, and is shown comprising registering actuating mechanism contained in a casing 18, which may be secured to the top of the casing 15 and has secured thereto at its top the registering mechanism casing 17a. Such mechanism in the casing 18 is shown comprising a bearing bracket 19 in which is rotatably mounted a shaft 20 to which is secured a gear 21. The gear 21 meshes with and is driven by a gear 22 secured to the driven shaft 23 of the gear train 16. Formed integral with the gear 21 and extending upwardly therefrom, as viewed in Fig. 1, is a hollow shaft 24 which is shown provided with a spline 25. Slidably mounted on, but rotatable with the shaft 24 is a clutch member 26. This clutch member 26 is shown provided with a circumferential groove 27 in which are disposed pin rollers 28 extending inwardly from opposite sides of a V-shaped yoke 29. Formed integral with the yoke 29 is a lever 30; such lever is shown pivotally mounted on a shaft 31 secured to a bearing bracket 32 attached to the casing 18. The end of the lever 30 remote from the yoke 29 is shown slotted to receive a pin or shaft 33 secured to the upper end of the plunger armature 34 of a solenoid 35. Extending into the hollow shaft 24 is a shaft 36 which extends downwardly from the casing 17a and constitutes the driving member of the registering mechanism, i. e., for operating the gearing and metering elements contained in the casing 17a. Secured to the shaft 36 is a clutch member 36a which cooperates with a clutch facing 37 on the clutch member 26.

Accordingly, the actuation of the registering mechanism contained in the casing 17a is controlled by the engagement or non-engagement of the clutch member 36a on the shaft 36 relative to the clutch facing 37 of the clutch member 26.

The minimum temperature means is associated with the pipe line for supplying the water as desired. Preferably, such association is had with the delivery pipe 38 shown connected to the delivery end 13 of the meter 10, and as one suitable temperature means I have shown a thermostat 40 which may be of the bi-metallic type shown housed within a casing 41, preferably of heat insulating material, the bi-metallic thermostat element 40 being secured to the casing 41 as by means of a bolt 42 of electrically conducting material, and positioned in proper thermal relation to the water delivered through the pipe 38. Such bolt 42 is shown connected to the conductor 43, in turn connected to a terminal of any suitable source of electrical energy, as for example, the battery 44, as shown. The free end of the bi-metallic element 40 is shown provided with a contact 45 which is adapted to engage a contact 46 which may be the head of a bolt 47, which may be connected by a conductor 48 to one terminal of the solenoid 35. The other terminal of the solenoid 35 is shown connected to a conductor 49, having its other end connected to the other terminal of the electrical source 44.

The thermostatic element is selected or may be of the conventional adjustable type, for the desired minimum temperature, whereat its terminal 45 is brought into engagement with the contact 46 to thereby close the electrical circuit through the conductors 48, 49, thereby energizing the solenoid 35, with attendant downward movement of the plunger armature 34, causing movement of the lever 30 about its shaft 31, thereby bringing the clutch facing 37 into engagement with the clutch disk 36 and thus connecting the meter registering mechanism contained in the casing 17a with the water actuated gear train 16. It is observed, that bottom chamber portion 10 of the meter casing serves as conduit means connecting the supply pipe 12 with the delivery pipe 38. Such actuation of the registering mechanism will continue—assuming the water to continue flow through the pipe 38 effected by opening of a faucet or other drawing of the water by the consumer—as long as the temperature of such water is at or above the predetermined minimum. Should the temperature of the water in the delivery pipe 38 fall below the predetermined minimum, the thermostatic element will be brought back into the position shown in Fig. 1, i. e. causing disengagement between the terminal 45 of the thermostatic element 40 and the terminal 46, and interrupting the electrical circuit of the solenoid 35, whereupon the clutch member 26 and its thereto attached parts including the clutch facing 37, overbalancing in weight the solenoid plunger 34, causes the clutch facing 37 to drop out of engagement with the clutch disk 36a.

Upon closing the faucet or other discontinuance of drawing water by the consumer, the flow of water through the delivery pipe 38 ceases, with attendant non-actuation of the water flow actuated mechanism and non-registering of the meter mechanism.

The embodiment shown in Fig. 3 affords the use of a conventional meter, see 50, and a by-pass conduit relative thereto, the water being controlled in flow alternatively through the meter or the by-pass conduit dependent upon the temperature of the water, as appears more fully hereinafter.

Such meter 50 is shown connected in a supply line of which the pipe 51 is the supply end and the pipe 52 is the exit end. Connected to the supply pipe 51 by coupling 53 is shown a casing 54 containing a valve and temperature responsive actuating means therefor, for controlling the alternative flow of the water.

The threaded inlet end 55 of the meter 50 is shown connected to the casing 54 at its opening 56, the exit end 57 of the meter 50 is shown connected through nipple 58 and T 59 to the outlet pipe 52.

The valve casing 54 is provided with a laterally extending member 60 which is shown screw-threadedly connected to a reducing nipple 61. The nipple 61 is shown threaded to an elbow 62 which is threaded at its other end to the by-pass 63. The other end of the by-pass conduit 63 is shown connected through the elbow 64, pipe 65, and the T 59, to the delivery pipe 52.

Within valve casing 54 is a valve seat 66 the opening of which leads to the meter 50, and also a valve seat 67 leading to the by-pass, as aforesaid. The valve seats 66 and 67 are spaced apart from one another but co-ordinated for alternative seating by the double valve structure 68. Such valve structure 68 is shown comprising an individual valve 69 cooperating with the valve seat 66 and an individual valve 70 cooperating with the valve seat 67. Movement of the valve member 68 as shown is had by the provision of an annular groove 71 into which extend pins 72 on the opposite ends of the yoke arm 73, secured to the free end of the lever 74, pivotally mounted at its end to a bearing shaft 75 carried by a bearing member 76, secured to and within the casing.

The thermostatic control means is suitably disposed within the casing 54, in advance of the valve seats 66 and 67 and in a chamber 77. Such thermostatic means is shown as of the bi-metallic type, see 78, and is thus exposed directly to the water passing through the casing 54. Such thermostatic member 78 is shown of the snap-action or toggle type and may be mounted at its ends in suitable recesses, and connected by the link 79 to the lever 74, to thereby control the alternative seating of the double valve 68 relative to respective valve seats 66 and 67, in accordance with the temperature of the water.

Referring to Fig. 3, the positions of the parts, particularly the valve 69, corresponds to the condition that the water flowing from the source of supply through the inlet pipe 51 is at a temperature at or above the predetermined minimum, in which circumstance the valve 70 is in engagement with its valve seat 67, and, therefore the water heated to or above the desired temperature is excluded from the by-pass conduit means, aforesaid. Such heated water, accordingly, upon opening of a faucet or other withdrawal by the user, flows through the valve seat 66 and entrance pipe 55 of the registering meter 50, and thence through delivery pipe 52. Should, however, the temperature of the water being supplied fall below the predetermined minimum, the thermostatic element 78 thus influenced by the low temperature flexes into its dotted position shown in Fig. 3, and causing the lever 74 to be shifted, to bring the valves 69 into engagement with the valve seat 66, and diverting the water through the by-pass conduit means, above referred to.

The thermostatic element 78 is either selected for proper operation at the desired predetermined minimum, or is of the conventional regulatable type for attaining the proper temperature response.

Whereas, I have described this invention by reference to specific forms thereof it will be understood that many changes and modifications may be made without departing from the spirit of the invention.

I claim:

1. The combination of liquid flow registering mechanism, piping for conveying the liquid to such registering mechanism from a suitable supply and piping for delivering liquid to one or more locations of withdrawal, thermostatic means responsive to the temperature of the liquid in such delivery piping, and means operative solely in one or the other of two positions controlled by said thermostatic means, said one position effecting the actuation of said registering mechanism when the temperature of the liquid in such delivery piping is at or above a predetermined minimum, said other position effecting the non-actuation of said registering mechanism when the temperature of the liquid in such delivery piping is less than such predetermined minimum.

2. The combination of liquid flow registering mechanism, supply piping for conveying the liquid and leading from a suitable supply toward said registering mechanism, delivery piping for conveying the liquid to one or more locations of withdrawal, thermostatic means responsive to the temperature of the liquid in one of said pipings, conduit means interconnecting said supply piping with said delivery piping, and means operative solely in one or the other of two positions controlled by said thermostatic means, said one position effecting the actuation of said registering mechanism when the temperature of the liquid is at or above a predetermined minimum, said other position effecting the non-actuation of said registering mechanism when the temperature of the liquid is less than the predetermined minimum.

3. The combination of liquid flow registering mechanism, supply piping for conveying the liquid and leading from a suitable supply toward said registering mechanism, delivery piping for conveying the liquid to one or more locations of withdrawal, thermostatic means responsive to the temperature of the liquid in such delivery piping, conduit means interconnecting said supply piping with said delivery piping, mechanism actuated by liquid flow, and means operative solely in one or the other of two positions controlled by said thermostatic means, said one position effecting the actuation of said registering mechanism by said liquid flow actuated mechanism when the temperature of the liquid is at or above a predetermined minimum, said other position effecting the non-actuation of said registering mechanism by said liquid flow actuated mechanism when the temperature of the liquid is less than the predetermined minimum.

4. The combination of liquid flow registering mechanism, supply piping for conveying the liquid and leading from a suitable supply toward said registering mechanism, delivery piping for conveying the liquid to one or more locations of withdrawal, thermostatic means responsive to the temperature of the liquid in such delivery piping, conduit means interconnecting said supply piping with said delivery piping, mechanism continuously actuated by liquid flow disposed in said interconnecting conduit means, and means operative solely in one or the other of two positions controlled by said thermostatic means, said one position effecting the actuation of said registering mechanism by said liquid flow actuated mechanism when the temperature of the liquid is at or above a predetermined minimum, said other position effecting the non-actuation of said registering mechanism by said liquid flow actuated mechanism when the temperature of the liquid is less than the predetermined minimum.

ALAN J. VAN DEN BERG.